(12) United States Patent
Bateson

(10) Patent No.: US 10,878,426 B2
(45) Date of Patent: Dec. 29, 2020

(54) VALUE ADD SERVICE FOR MOBILE POINT OF SALE

(71) Applicant: MasterCard International Incorporated, Purchase, NY (US)

(72) Inventor: Patricia Bateson, Brussels (BE)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 1270 days.

(21) Appl. No.: 14/471,443

(22) Filed: Aug. 28, 2014

(65) Prior Publication Data

US 2015/0066777 A1  Mar. 5, 2015

(30) Foreign Application Priority Data

Aug. 28, 2013 (GB) .................................. 1315314.3

(51) Int. Cl.
*G06Q 30/00* (2012.01)
*G06Q 20/34* (2012.01)
*G06Q 20/20* (2012.01)

(52) U.S. Cl.
CPC .......... *G06Q 30/012* (2013.01); *G06Q 20/20* (2013.01); *G06Q 20/34* (2013.01); *G06Q 30/018* (2013.01); *G06Q 30/0185* (2013.01)

(58) Field of Classification Search
CPC .... G06Q 30/0185; G06Q 20/20; G06Q 20/34; G06Q 30/012
USPC ........................................................ 705/318
See application file for complete search history.

(56) References Cited

U.S. PATENT DOCUMENTS

| 8,682,802 B1* | 3/2014 | Kannanari ........... G06Q 20/367 705/64 |
| 9,569,781 B2* | 2/2017 | Tuchman ............... H04L 63/104 |
| 9,652,806 B2* | 5/2017 | Czaja ..................... G06Q 40/08 |
| 9,727,862 B2* | 8/2017 | O'Connell ......... G06Q 20/3821 |
| 2002/0091573 A1* | 7/2002 | Hodes .................... B65D 5/422 705/17 |
| 2003/0182140 A1* | 9/2003 | Furuya ................. G06Q 30/012 705/302 |

(Continued)

FOREIGN PATENT DOCUMENTS

WO  WO-2011006198 A1 *  1/2011  ............. G06Q 20/20

*Primary Examiner* — Jacob C. Coppola
(74) *Attorney, Agent, or Firm* — Buchanan Ingersoll & Rooney PC

(57) ABSTRACT

The present invention provides a method and system for validating the authenticity of products in which a known payment network infrastructure is used to convey messages for applications other than effecting financial transactions. In particular, the invention provides a method of allocating an identification number to a product manufacturer that may be processed in the same manner as a Personal Account Number (PAN). Standard network messages from the payment network infrastructure may then be used to record an action for example verifying the authenticity of the product. Conveniently, such standard network messages may be translated by an application, for example running on a mobile point of sale (MPOS) device or a suitably enabled smart device, into a more MPOS-user readable format more associated with a warranty action (e.g. a given standard network message may be translated into a "warranty activated" message).

10 Claims, 6 Drawing Sheets

(56) References Cited

U.S. PATENT DOCUMENTS

| | | | | |
|---|---|---|---|---|
| 2006/0212357 | A1* | 9/2006 | White | G06Q 20/206 705/18 |
| 2009/0037281 | A1* | 2/2009 | Devlin | G06Q 20/20 705/14.14 |
| 2009/0138365 | A1* | 5/2009 | Mueller | G06Q 20/12 705/14.19 |
| 2010/0131342 | A1* | 5/2010 | Thibedeau | G06Q 20/202 705/14.13 |
| 2010/0145813 | A1* | 6/2010 | Veseli | G06F 21/64 705/21 |
| 2010/0235250 | A1* | 9/2010 | Bar-Levav | G06Q 10/087 705/23 |
| 2011/0131135 | A1* | 6/2011 | Carlson | G06Q 10/00 705/44 |
| 2012/0011072 | A1* | 1/2012 | Lodolo | G06Q 20/045 705/302 |
| 2012/0039469 | A1* | 2/2012 | Mueller | G06Q 20/12 380/252 |
| 2012/0191484 | A1* | 7/2012 | Van | G06Q 20/202 705/4 |
| 2013/0024493 | A1* | 1/2013 | Salonen | G06Q 10/02 709/202 |
| 2013/0246199 | A1* | 9/2013 | Carlson | G06Q 20/20 705/16 |
| 2015/0032627 | A1* | 1/2015 | Dill | G06Q 20/385 705/44 |
| 2015/0154605 | A1* | 6/2015 | Arevshatian | G06Q 30/01 705/302 |
| 2015/0193756 | A1* | 7/2015 | Van | G06Q 20/202 705/17 |

\* cited by examiner

VALUE ADD SERVICE FOR MOBILE POINT OF SALE

FIELD OF INVENTION

The invention relates to methods and systems for using existing payment network infrastructure to interrogate a database. The invention is particularly applicable to interrogating a database to establish the authenticity of a product.

BACKGROUND

Traditionally, payment network infrastructure is used for performing financial transactions. Financial transactions to be carried out between banks are generally associated with a card payment scheme, such as MasterCard or Visa. These schemes provide a system for enabling interaction between one bank and another with the card payment scheme acting as an intermediary. Referring to FIG. 1, the card payment scheme provides a payment network 10 which acts as a bridge between an acquirer 12 (the bank with which the merchant has its account), and an issuer 14 (the bank with which the cardholder 16 has its account and which has issued the cardholder's card 18). In order to initiate and complete a payment transaction the merchant has a point of sale terminal (hereafter 'POS') 20 including a payment application (hereafter 'payment app') 22 for interacting with the card 18 and the payment infrastructure.

In the example of FIG. 1, the card 18 is a magstripe card. The bank that issued with the card is associated with a bank identification number (BIN) 24 and the card 18 carries a unique personal account number (PAN) that is associated with that BIN (for example, if the card was issued by NatWest then the BIN associated with the card identifies NatWest and the personal account number identifies the cardholder's bank account with NatWest). It is noted that the card would carry the unique PAN and the BIN would normally be equivalent to the first few digits of the PAN (typically six digits but it could arguably be any number of digits).

With reference to FIG. 2, in order to initiate a payment transaction, for example to purchase goods in a shop, the cardholder presents at step 30 the card 18 to the POS 20 by swiping the magstripe of the card 18 in a magstripe reader of the POS 20 (Note: in an alternative example the card 18 may be a "chip & pin" style card and the card may be presented to the POS 20 by inserting the card into the POS so that the chip can be read). The payment app 22 of the POS 20 requests at step 32 authorisation from the acquirer 12, which includes transmitting to the acquirer various details of the transaction including the sale amount and the PAN 24. The acquirer 12 then passes at step 34 the request to the payment network 10 so that the card payment scheme operating the payment network 10 can check various card security features, identify the cardholder's bank (i.e. the issuer 14 of that particular card PAN), and forward at step 36 the request to the appropriate issuer 14. The issuer 14 then approves at step 38 the transaction by checking that there are sufficient funds in the cardholder's account, and approval is forwarded at step 40 to the payment network 10, then to the acquirer 12 (step 42), and finally to the POS 20 (step 44). The payment transaction is completed at step 46 by transfer of monies from the acquirer 12 to the merchant and from the cardholder 16 to the issuer 14, as well as during an end of day reconciliation process in which the payment network 10 collects funds from card issuers, deducts fees and settles with transaction acquirers according to a settlement report for that day generated by the payment network 10. It is noted that step 46 may not occur while the cardholder is present in the shop and the transfer of monies may occur some time after the cardholder has left the shop.

In a situation in which the payment network 10 does not receive a response from the cardholder's bank (e.g. because the network is too busy), there is the opportunity depending on the BIN of the card for the payment network 10 to pass the request to a payment network 'stand in processor' 26 which checks that the BIN 24 belongs to a list of BINs stored in a BIN database 28. If the BIN 24 is listed in the database 28, authorisation for the transaction may potentially be provided based on standing instructions from the cardholder's bank. In certain circumstances, however, the 'stand in processor' 26 may not be able to provide authorisation to the request and it may then return a 'standard network' message to be forwarded to the POS and displayed to the merchant. An example of such a standard network message may be an instruction to the shop/POS operator to call the card issuer ('call issuer' message).

The invention aims at addressing one or more limitations in functionality or in applicability associated with the prior art.

STATEMENTS OF INVENTION

The present invention provides a method and system for validating the authenticity of products in which a known payment network infrastructure is used to convey messages for applications other than effecting financial transactions. In particular, the invention provides a method of allocating an identification number to a product manufacturer that may be processed in the same manner as a Personal Account Number (PAN). Standard network messages from the payment network infrastructure may then be used to record an action for example verifying the authenticity of the product. Conveniently, such standard network messages may be translated by an application, for example running on a mobile point of sale (MPOS) device or a suitably enabled smart device, into a more MPOS-user readable format more associated with a warranty action (e.g. a given standard network message may be translated into a "warranty activated" message).

The invention may also be expressed as a method for verifying the authenticity of a product, the method comprising sending a manufacturer identification number across a known payment network infrastructure and returning a standard network message in response. Conveniently, the present invention does not require an acquirer entity in order to operate as a device enabled according to the present invention may interact directly with the payment network infrastructure.

The invention also resides in an issued card having a manufacturer identification number (hereinafter referred to as a "BIN") and a unique number (also referred to herein as the personal account number or PAN) associated with a product for sale. The BIN/unique number is preferably also associated with triggering the activation of a manufacturer's warranty associated with the product.

The present invention extends to a non-transitory computer readable medium for carrying a computer readable code for controlling a communications device to carry out the method of the present invention and a non-transitory computer readable medium for carrying a computer readable code for controlling a payment network infrastructure to carry out the method of the present invention.

Non-transitory computer-readable media comprise all computer-readable media, with the sole exception being a transitory, propagating signal.

According to a first aspect of the present invention there is provided, a method of indicating the authenticity of a product for sale using a payment network infrastructure, the method comprising;

providing a token, the token including a unique number associated with the product for sale; reading the unique number;

sending a message over the network infrastructure to a database, the message based on the unique number; and returning a standard payment message in response, the standard payment message indicating the authenticity of the product for sale.

The method may further comprise;

translating the standard payment message to a replacement message.

The method may further comprise;

transmitting a warranty activation message to a warranty activation log database; and recording the warranty activation message in the warranty activation log database, the warranty activation message include the unique number.

The method may further comprise;

accessing the warranty activation log database and effecting activation of a warranty of the product for sale based on the presence of a recorded unique number.

The method may further comprise;

determining a popularity of a product for sale based on the volume of unique numbers recorded in the warranty activation log database.

The step of transmitting the warranty activation message to a warranty activation log database may include the step of forwarding the standard payment message to the warranty activation log database.

The method may further comprise;

determining a popularity of goods for sale based on the volume of unique numbers recorded in the warranty activation log database.

The network may be operated by a card scheme arranged to check the message and route the message to the database in response to the presence of the unique number being associated with the database.

The database may be a Bank Identification Number (BIN) database and the unique number may include a BIN, the method may further comprise;

comparing the BIN of the unique number with the or each BIN in the database;

returning a standard payment message in response to the BIN being present in the database.

The BIN may be associated with at least one of a product manufacturer, a warranty provider, and an insurance provider.

According to a further aspect of the present invention there is provided a token for identifying a product for sale, the token including a unique number associated with the product for sale, the token being readable by a Point of Sale (POS) terminal arranged to send a message, based on the unique number, over a payment network infrastructure to a database and return a standard payment message in response, the standard payment message indicating the authenticity of the product for sale.

The token may be a card selected from the list of a magstripe card and a 'chip and pin' card.

The unique number may include a Bank Identification Number (BIN), wherein the BIN may be associated with at least one of a product manufacturer, a warranty provider, and an insurance provider.

The unique number may include a Personal Account Number (PAN) specific to the product for sale.

The BIN may be derivable from the PAN.

According to a further aspect of the present invention there is provided a Point of Sale (POS) terminal comprising a reader arranged to read a token, the token having a unique number associated with a product for sale, wherein the POS includes a payment application arranged to send a message over a payment network infrastructure to a database and receive a standard payment message returned over the network, and wherein the POS is arranged to display an indication of the authenticity of the product for sale in response to receiving the standard payment message.

The POS may further comprise a translation module for translating the standard payment message into a replacement message, the display may be arranged to display the replacement message to indicate the authenticity of the product for sale.

The replacement message may be selected from the list of 'product authenticated', 'authentication complete', and 'warranty activated'.

The POS may further comprise a warranty activation log module for communicating with the warranty activation log database to transmit a message to the warranty activation log database indicating that a product warranty is to be activated.

The reader may be selected from the list of a chip and pin reader and a magstripe reader.

According to a further aspect of the present invention there is provided a method of interrogating a database using a payment network infrastructure, comprising;

providing a database including at least one Bank Identification Number (BIN), wherein the or each BIN is associated with at least one of a product manufacturer, a warranty provider, and an insurance provider;

sending a message over the payment network infrastructure to the database, the message including a unique number associated with a product for sale, a BIN number being derivable from the unique number;

comparing the BIN of the unique number with the or each BIN in the database;

returning a standard payment message in response to the BIN being present in the database.

According to a further aspect of the present invention there is provided a method of interrogating a database using a payment network infrastructure, comprising;

providing a warranty activation log database;

sending a message to the warranty activation log database, the message based on a unique number associated with a product for sale; and recording the unique message in the warranty activation log database.

The method may further comprise accessing the warranty activation log database and effecting activation of a warranty of the product for sale based on the presence of a recording unique number.

The method may further comprise determining a popularity of a product for sale based on the number of unique numbers recorded in the warranty activation log database.

Within the scope of this application it is expressly intended that the various aspects, embodiments, examples and alternatives set out in the preceding paragraphs, in the claims and/or in the following description and drawings, and in particular the individual features thereof, may be taken independently or in any combination. Features described in connection with one embodiment are applicable to all embodiments, unless such features are incompatible.

BRIEF DESCRIPTION OF THE DRAWINGS

In order that the invention may be more readily understood, reference will now be made, by way of example, to the accompanying drawings, of which.

Throughout the figures, like reference numerals are used to denote like features.

DETAILED DESCRIPTION OF IMPLEMENTATION OF THE INVENTION

As used herein, "secure tokens" or "tokens" generally can refer to any device configured to interact with a Point of Sale (POS) terminal and perform tasks related to product authentication.

Figure 3:
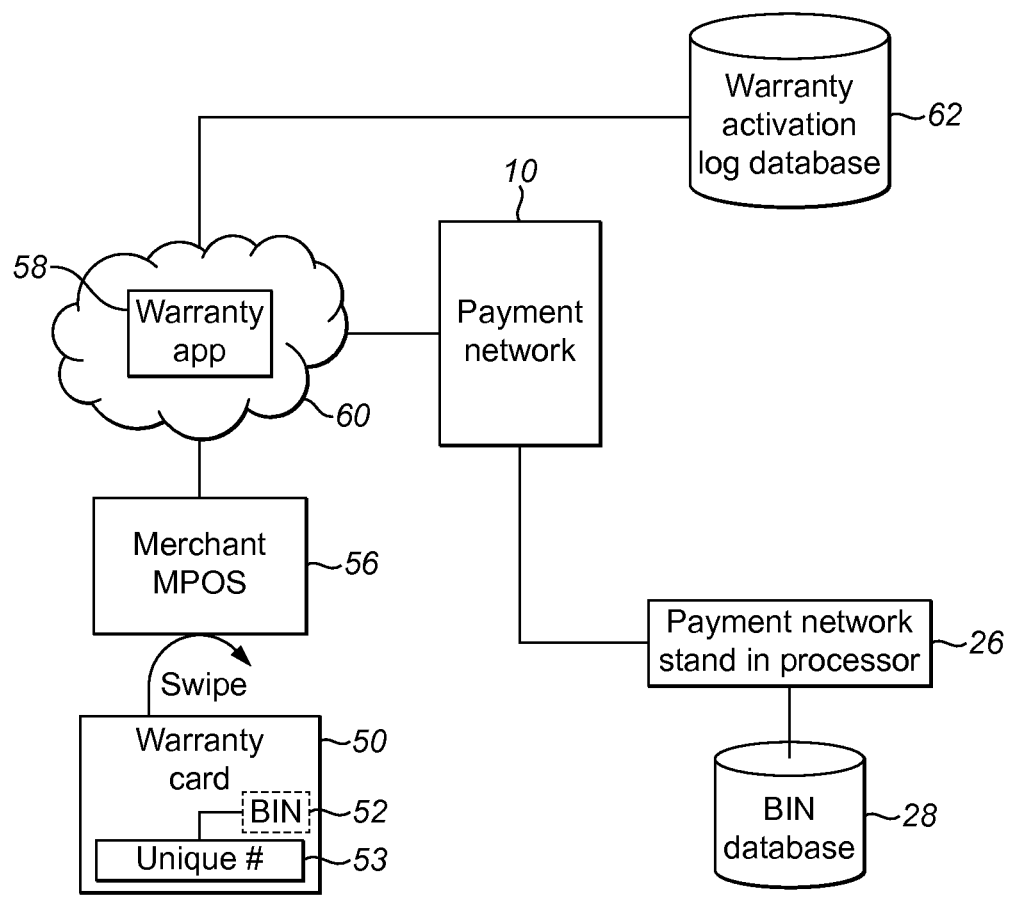
FIG. 3 is a schematic block diagram of a system for performing a warranty validation according to the invention.

Referring to FIG. 3, a payment network 10 plays the role of an intermediary in a series of communications for checking the authenticity of a product. In this approach, aspects of the infrastructure of a payment network are used to carry out product authentication by repurposing various standard procedures and messages that would normally be used to effect a financial transaction. In the system of FIG. 3 there is no acquirer and no issuer. These parties are not required because the "transaction" to be carried out is not financial in nature and there will be no transfer of monies. Rather, the transaction to be carried out is a series of communications and messages according to a predefined protocol.

In this approach, a product for sale is provided with, for example packaged together with, a token in the form of a card 50 which enables the authenticity of the product to be verified. The card 50 in this case is a warranty card 50. The warranty card 50 also enables a product warranty provided by the product manufacturer to be activated when a cardholder purchases the product.

The warranty card 50 is provided as a payment card issued under a BIN 52 that is associated with a product manufacturer rather than an Issuer offering payment services. It is noted that the warranty provider may be the same as the product manufacturer. However, alternatively the BIN 52 may be associated with a warranty or insurance provider who is distinct from the product manufacturer. This means that the ascribed BIN 52 cannot be used to effective financial transactions and as a result the card 50 is a dedicated card for the purpose of verifying product authenticity and triggering the activation of the warranty. For example, a goods manufacturer may be provided with a BIN that can then be used during a warranty activation service. In such an example the goods manufacturer may include a payment card with each item they sold. The card issued under the manufacturer's BIN 52 (in lieu of a bank's BIN) would contain a unique "personal account number" 53 that is uniquely associated with that particular goods item. The manufacturer's BIN may therefore comprise a plurality of unique numbers 53 that are issued under the BIN 52, each unique number 53 relating to a unique sale item.

The unique number 53 on a given warranty card 50 is then used to establish product authenticity. To authenticate the product, the BIN 52 may be derived from the unique number (PAN) 53 and the BIN 52 may then be checked to ensure it belongs to the set of BINs that have been associated with issued warranty cards and if it does the product is considered to be authentic. A list of the BINs belonging to the set is stored in a database which in this case is in the form of a BIN database 28 which is operated by the card scheme that operates the payment network 10. The payment network and the messages it transmits are used to check that warranty cards being interrogated are associated with a BIN stored in the list at the BIN database 28. The received unique number 53 can then be communicated back to the manufacturer in order to inform then that the particular product item has been sold and that the warranty should be activated.

[Note: In FIG. 3 it is noted that the BIN 52 appears as a dotted box on the card. This is intended to indicate that the BIN 52 can be derived from the unique number/PAN 53. In this example the BIN 52 itself is not carried on the card or sent from the MPOS to the payment network 10. Instead the unique number/PAN 53 is sent and the BIN 52 is derived from the unique number 53]

As shown in FIG. 3, the payment network 10 is connected to the payment network stand in processor 26 as normal. The BIN database 28 is coupled to the 'stand in processor' 26 and these three items are operated by the card scheme. A merchant mobile POS (MPOS) 56 is connected to the payment network 10 via a warranty application (hereafter 'warranty app') 58 stored on the Cloud 60, and the app 58 communicates with a log database 62 for logging information relating to the activation of product warranties. The app 58 is connected to the payment network 10 either directly from the MPOS 56 or via the MPOS solution providers.

The MPOS 56 is an EMV compliant terminal. EMV stands for Europay, MasterCard, and Visa and is a standard protocol for operating financial transactions. The card 50 is also EMV compliant and so can be used with exiting POS terminals.

Figure 1:
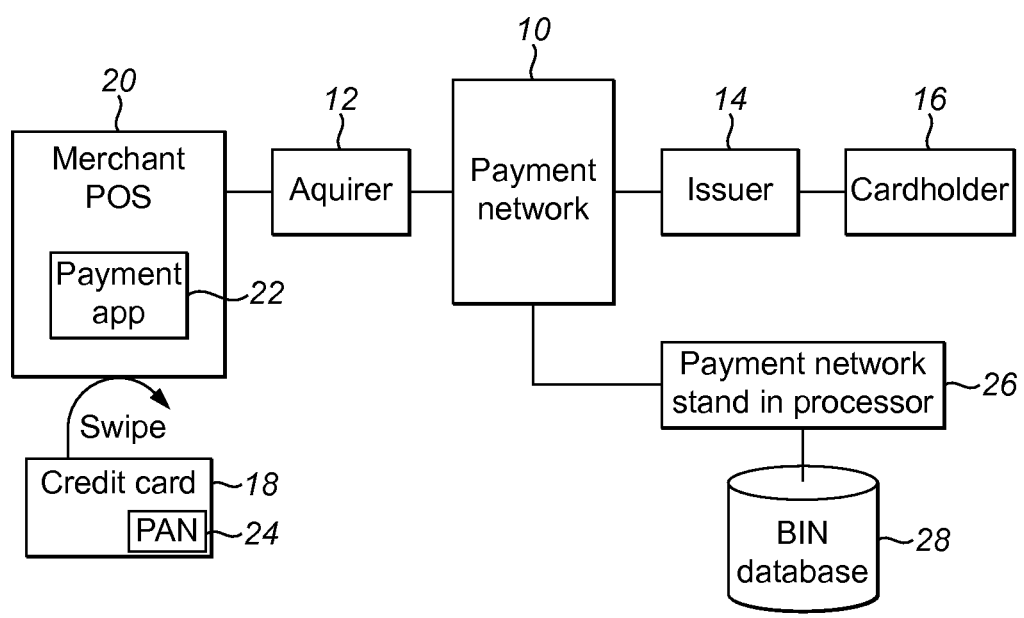
FIG. 1 is a schematic block diagram of a system for performing a financial transaction according to the prior art.
Figure 2:
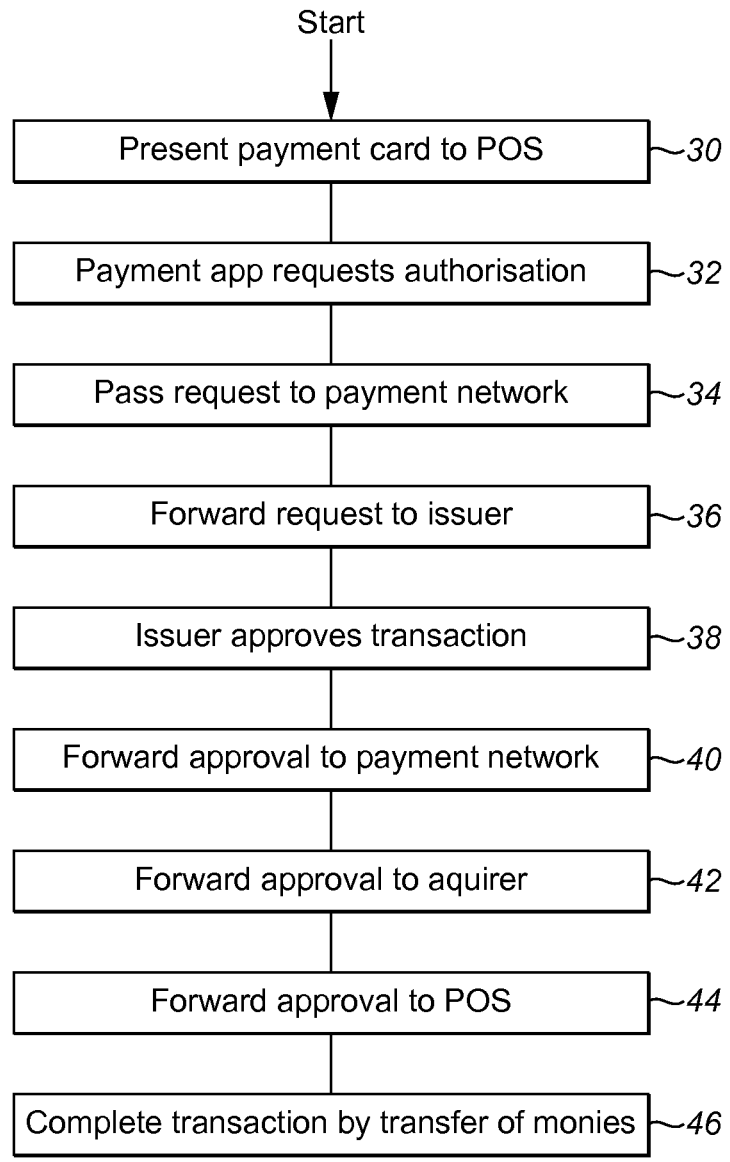
FIG. 2 is a flow chart showing a traditional method of performing a financial transaction using the known system of FIG. 1.
Figure 4:
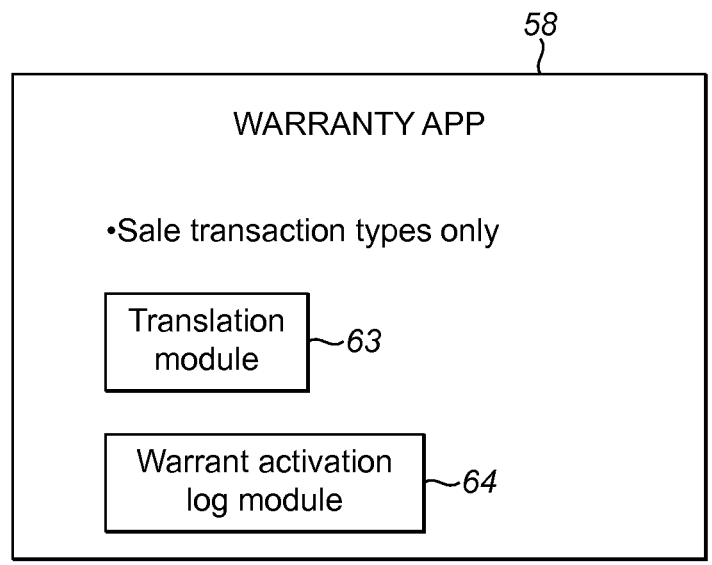
FIG. 4 is a schematic block diagram showing detail of a warranty application of the system of FIG. 3.

The warranty app 58 behaves in a similar way to the payment app 22 of the traditional payment system shown in FIG. 1. However, with reference to FIG. 4, it has a cut-down functionality and is restricted to only running sale transaction types rather than a range of transaction types including for example refund transactions. The warranty app 58 also has a translation module 63 for translating a standard inputted message into a replacement message and outputting this for display at the merchant POS 56. There is also a warranty activation log module 64 for communicating with the warranty activation log database 62.

A method of authenticating a product using a warranty card 50 will now be described. A warranty card 50 is provided to the product manufacturer so that the product and card 50 can be packaged together for delivery to a retail outlet or shop. At the shop the card 50 can be taken out of the packaging and used to perform a validation of the authenticity of the product, and also to trigger the activation of a manufacturer's warranty of the product.

Figure 5:
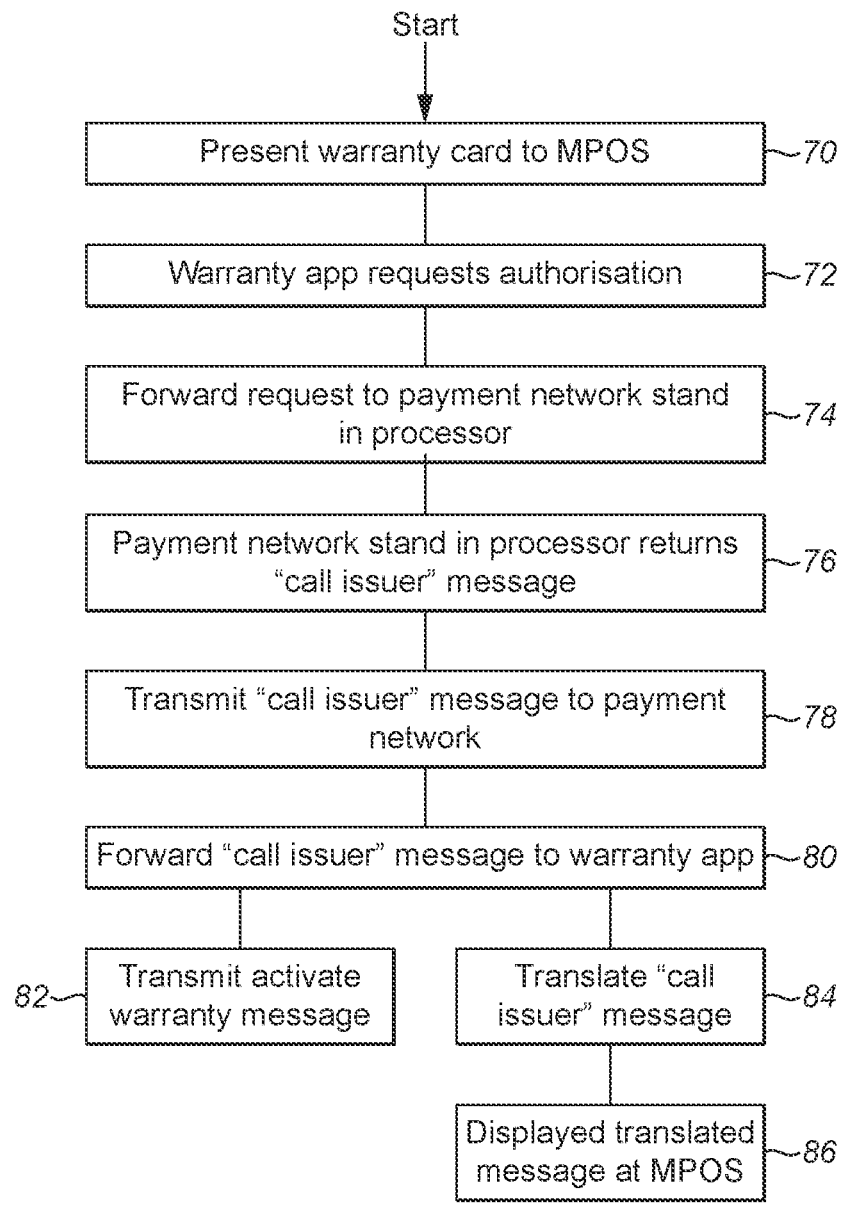
FIG. 5 is a flow chart showing a method of performing a warranty validation according to the invention using the system of FIG. 3.

With reference to FIG. 5, to initiate the authentication process the warranty card 50 is presented at step 70 to the merchant MPOS 56 by swiping a magstripe of the card 50 in a magstripe reader of the MPOS 56 (or by inserting a "chip and pin" card into a chip reader). This initiates a sale transaction of a nominal value using the warranty card 50. The nominal value may be selected by the merchant and a small amount such as £1 would be appropriate. However, any value will work because the value is immaterial: it will be appreciated that this is not a true sale transaction because no monies will be transferred; rather, the payment network infrastructure and standard messages of that system are being repurposed for the purpose of validating product authenticity. As a result, the initiation of a sale transaction is actually merely the initiation of a repurposed messaging protocol. Note: as an alternative to the merchant selecting a nominal amount, the nominal amount may be determined "behind the scenes" by the MPOS or warranty app 58 and the merchant may simply be required to select an "Activate Warranty" selection button on the MPOS.

Having read the magstripe/chip, the MPOS 56 passes the read card data to the warranty app 58 so that the warranty app 58 can request at step 72 authorisation for the nominal value transaction. Since there is no acquirer in the system, the warranty app 58 sends the request directly to the payment network 10. The request includes various details of the transaction including the nominal amount and the unique number (i.e. the PAN) 53 of the warranty card 50.

Once the request arrives at the payment network 10, it is processed in the same way that any normal request for a traditional financial transaction would be. Therefore, the card payment scheme operating the payment network 10 checks various card security features (e.g. checks that the unique number 53 is valid via a check digit or other validation method) and attempts to identify the cardholder's bank (by deriving the BIN 52 from the unique number 53 and then looking up the BIN 52 in the BIN database 28). Since the card 50 is solely for the purpose of product authentication and warranty activation, the BIN 52 that the warranty card 50 is issued under is associated with a goods vendor/manufacturer as opposed to an Issuing bank. As a result, the payment network 10 forwards at step 74 the request to the payment network stand in processor 26 which checks to establish whether the BIN 52 indicated in the request is listed in the BIN database 28.

Since the BIN 52 is a legitimate BIN, it will appear in the BIN database 28. However, rather than there being standing instructions or relevant relationship with a bank, the BIN 52 associated with the warranty card 50 will be associated with configuration instructions for the stand in processor 26 to return a particular network message. Consequently, the payment network stand in processor 26 returns at step 76 a 'standard network' message (as noted above an example of such a message is a 'call issuer' message). Although the literal meaning of the message is not appropriate for the purpose of product authentication, the message still indicates that the BIN 52 of the warranty card 50 is listed in the BIN database 28, thereby providing an indication that the product is authentic.

The 'standard network' message is transmitted at step 78 to the payment network 10, which forwards it at step 80 to the warranty app 58. Here, the warranty activation log module 64 transmits at step 82 a message to the warranty activation log database 62 indicating that the product warranty is to be activated. The message sent to the database 62 comprises unique number 53. The product manufacturer can then access the warranty activation log database 62 and effect activation of the warranty.

Alternatively, the warranty can be automatically activated in response to the warranty database receiving the warranty activation message.

It is also noted that the presence of the unique number 53 within the warranty activation log database 62 also allows a manufacturer to check where a product was sold (if details of the POS location are returned to the database along with the unique number 53). This in turn allows the manufacturer to assess the impact of grey imports. The database 62 also allows a manufacturer to check how popular certain goods items are via the volume of numbers recorded in the database.

Finally, the translation module 63 translates at step 84 the 'standard network' message into a more meaningful message such as 'product authenticated', 'authentication complete' or 'warranty activated' and the translated message is displayed at step 86 on the MPOS 56 for the merchant to see.

It will be appreciated that the MPOS 56 may be rebranded under the branding of the product manufacturer so that the service is presented to the cardholder as a product authentication and warranty activation service of the product manufacturer.

Figure 6:
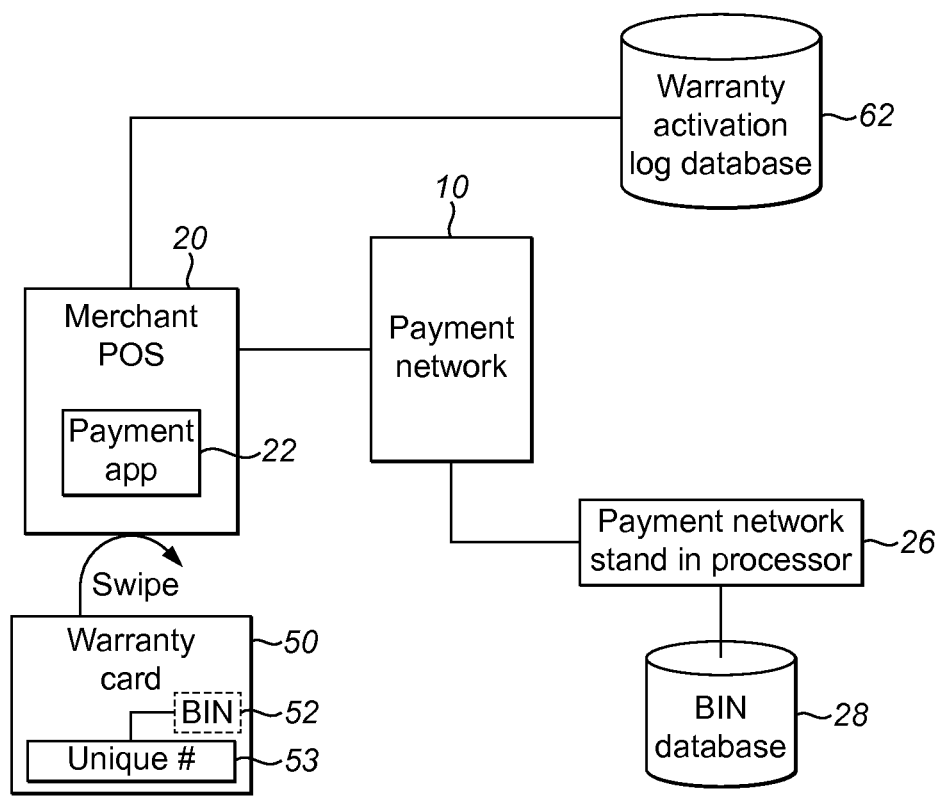
FIG. 6 is a schematic block diagram of a further system for performing a warranty validation according to the invention.

With reference to FIG. 6, a simplified system operating according to the same inventive concept is shown. It is not envisaged that the POS 20 of FIG. 6 would be rebranded in the way described above as this is a simplified, more basic arrangement.

In this arrangement, a warranty card 50 with a unique PAN is presented to a merchant POS 20 with a standard payment application 22. The functionality of the system is the same as the arrangement of FIG. 3 except that the returned standard network message will be displayed at the POS 20 untranslated and the warranty activation, if there is such a feature, would have to be linked to the financial sale transaction itself rather than the nominal amount transaction for authentication. However, the display of the 'standard network' message at the POS 20 in response to the presentation of the warranty card 50 to the POS 20 magstripe reader/chip reader would still indicate that the authenticity of the product had been successfully verified.

It is noted that the warranty app 58 shown in FIG. 3 is shown in the Cloud 60. As an alternative, it could be on the MPOS 56.

The MPOS 56 could be a smartphone or other smart device, such as a tablet, or other computing device with a suitable card reader.

The payment network (10, 26, 28) may send a warranty report to the product manufacturer to inform the product manufacturer of which products have been sold and which associated warranties should be activated. Alternatively, the payment network may send a warranty report (including received unique numbers 53 to the warranty activation log database 62).

In FIGS. 3 and 6 details of the products that have been verified are sent to the warranty activation log database 62 via the warranty app 58. Such details include the unique number/PAN 53 associated with the verified product in question. In alternative arrangements the payment network stand in processor 26 may store the verified product details which may then be downloaded to the warranty provider, insurance provider or product manufacturer. Such download may be achieved via a "push" message from the processor 26 or via a "pull" message from the warranty provider, insurance provider or product manufacturer. Such messages may be transmitted either as a product is verified or as a batch communication at a convenient point (e.g. the end of a business day).

The warranty card 50 described above may be used for warranty activations and also for other purposes (e.g. after sales activities). Alternatively, the warranty card 50 may be configured for one-time use in which case the database 28 can record when the card 50 has been used to verify authenticity and can then send an error message if an attempt is made to use the warranty card 50 again.

The MPOS 56 may be arranged to run both a warranty app 58 and a payment app 22. Alternatively, the MPOS may be arranged to run/support the warranty app 58 only.

What is claimed is:

1. A method of activating a warranty for a specific product using a payment network infrastructure including a payment network and a payment network stand-in processor, the method comprising:
   electronically reading, by a magstripe reader or chip reader of a point of sale terminal, a unique product identifier from a physical token device, wherein said unique product identifier uniquely identifies the specific product and includes a Bank Identification Number (BIN), wherein said BIN is associated with at least one of a product manufacturer, a warranty provider, and an insurance provider;
   sending a first message, from a warranty application installed on the point of sale terminal, directly to the payment network infrastructure, wherein the first message includes the unique product identifier, and wherein the sending the first message includes the point of sale terminal transmitting, via the warranty application, the first message to the payment network stand-in processor;
   receiving, by the warranty application installed on the point of sale terminal, from the payment network stand-in processor, a standard payment message indicating the authenticity of the specific product when the authenticity of the unique product identifier included in the first message is determined by the stand-in processor using the BIN;
   sending a warranty activation message, from the warranty application installed on the point of sale terminal, to an external warranty activation log database, wherein the warranty activation message comprises the unique product identifier and a location of the point of sale terminal, wherein the sending the warranty activation message includes forwarding the standard payment message to the external warranty activation log database; and
   translating, by the warranty application, the received standard payment message to a warranty activation message that is viewable on a display of the point of sale terminal, wherein said warranty activation message indicates the activation of the warranty for the specific product.

2. The method of claim 1 further comprising:
   accessing the external warranty activation log database and effecting activation of the warranty of the specific product based on the unique product identifier.

3. The method of claim 1 wherein the BIN is associated with the external warranty activation log database of at least one of the product manufacturer, a warranty provider, and an insurance provider.

4. The method of claim 1, wherein the physical token device is a card selected from the list of a magstripe card and a 'chip and pin' card.

5. The method of claim 1 wherein the unique product identifier includes a Personal Account Number (PAN) specific to the specific product.

6. The method of claim 5 wherein the BIN is derivable from the PAN.

7. A Point of Sale (POS) terminal comprising:
   a reader configured to electronically read a unique product identifier from a physical token device, wherein said reader is one of a magstripe reader and a chip reader, and wherein said unique product identifier uniquely identifies a specific product and includes a Bank Identification Number (BIN), wherein said BIN is associated with at least one of a product manufacturer, a warranty provider, and an insurance provider;
   a processor;
   a memory storing a warranty application that, when executed by the processor, causes the processor to perform a method of activating a warranty for the specific product using a payment network infrastructure including a payment network and a payment network stand-in processor, the method comprising:
      sending a first message directly to the payment network infrastructure, wherein the first message includes the unique product identifier obtained by the reader, and wherein the sending the first message includes transmitting the first message to the payment network stand-in processor;
      receiving from the payment network stand-in processor, a standard payment message indicating the authenticity of the specific product when the authenticity of the unique product identifier included in the first message is determined by the stand-in processor using the BIN;
      sending a warranty activation message to an external warranty activation log database, wherein the warranty activation message comprises the unique product identifier and a location of the POS terminal, wherein the sending the warranty activation message includes forwarding the standard payment message to the external warranty activation log database; and
      translating the received standard payment message to a warranty activation message that is viewable on a display of the POS terminal, wherein said warranty activation message indicates the activation of the warranty for the specific product; and
   the display configured to display an indication of the authenticity of the specific product upon translation of the standard payment message.

8. The POS terminal of claim 7 wherein the warranty activation message that is viewable on a display of the POS terminal is selected from the list of 'product authenticated', 'authentication complete', and 'warranty activated'.

9. The POS terminal of claim 7 wherein the reader is selected from the list of a chip and pin reader and a magstripe reader.

10. A financial transaction system for establishing authenticity of a product, the system comprising:
   a payment network infrastructure including a payment network and a payment network stand-in processor;
   a point of sale terminal including (i) a warranty application installed thereon, (ii) a processor, and (iii) at least one of a magstripe reader and a chip reader configured to read a unique product identifier from a physical token device, wherein said unique product identifier uniquely identifies a specific product and includes a Bank Identification Number (BIN), wherein said BIN is associated with at least one of a product manufacturer, a warranty provider, and an insurance provider, and an external warranty activation log database that is external to the payment network infrastructure and to the point of sale terminal, wherein the warranty application, when executed by the processor, causes the processor to perform a method of activating a warranty for the specific product using the payment network infrastructure including the payment network and the payment network stand-in processor, the method comprising:

sending a first message directly to the payment network infrastructure, wherein the first message includes the unique product identifier obtained by the reader, and wherein the sending the first message includes transmitting the first message to the payment network stand-in processor;

receiving from the payment network stand-in processor, a standard payment message indicating the authenticity of the specific product when the authenticity of the unique product identifier included in the first message is determined by the stand-in processor using the BIN;

sending a warranty activation message to the external warranty activation log database, wherein the warranty activation message comprises the unique product identifier and a location of the POS terminal, wherein the sending the warranty activation message includes forwarding the standard payment message to the external warranty activation log database; and translating the received standard payment message to a warranty activation message that is viewable on a display of the POS terminal, wherein said warranty activation message indicates the activation of the warranty for the specific product.

* * * * *